United States Patent [19]

Cleva

[11] 4,218,820
[45] Aug. 26, 1980

[54] HAND-ACTUATED CHAIN SAW

[76] Inventor: William Cleva, 502 Commack Rd., Commack, N.Y. 11725

[21] Appl. No.: 24,414

[22] Filed: Mar. 27, 1979

[51] Int. Cl.³ .................... B27B 21/00; B27B 33/14
[52] U.S. Cl. ............................... 30/166 R; 30/381;
83/830; 83/832; 145/31 R
[58] Field of Search ............... 83/830, 831, 832, 833,
83/834; 145/31 R; 30/381, 166 R

[56] References Cited

U.S. PATENT DOCUMENTS

| 1,004,245 | 9/1911 | Crouch | 83/832 |
|---|---|---|---|
| 1,229,597 | 6/1917 | Farrer | 83/830 |
| 2,752,964 | 7/1956 | Prusinski | 145/31 R |
| 2,855,724 | 10/1958 | Graves | 30/381 |
| 3,123,110 | 3/1964 | Keway | 83/832 |
| 3,747,652 | 7/1973 | Meadows | 145/31 R |

*Primary Examiner*—Donld R. Schran
*Attorney, Agent, or Firm*—Eric P. Schellin

[57] ABSTRACT

There is disclosed a reciprocating chain saw made up of a length of chain formed by a plurality of serially pivotally connected cutters, a number of which cut when the chain is moved in one direction, and a number of which cut when the chain is moved in the other direction. In one use of the chain saw, it is adapted to be connected at its opposite ends to the two branches of a rope or the like, one end of which may be thrown up and around the limb of the tree which is to be cut. The cutting means disclosed are generally similar to those of conventional motor driven chain saws with the exception that no sprocket means need be provided on the chain. In one of the disclosed embodiments of the chain saw of the invention, the chain is so constructed that it can bend or flex in only one direction, so that the disposition of the chain, in the correct position upon a limb to be cut is assured. In another disclosed embodiment of the chain saw of the invention, the serially connected cutting means are provided with cutting edges and depth gauges on both sides of the chain, the chain then being permitted to bend in either direction. The difference in height between the tips of the depth gauges and the tips of the cutting blades determines the thickness of the chip taken by the blade. Such difference in height, which may be made different for different cutting operations, may, if desired, be made somewhat less than that employed in the chains of power-driven chain saws to decrease the effort required to reciprocate the chain manually.

6 Claims, 7 Drawing Figures

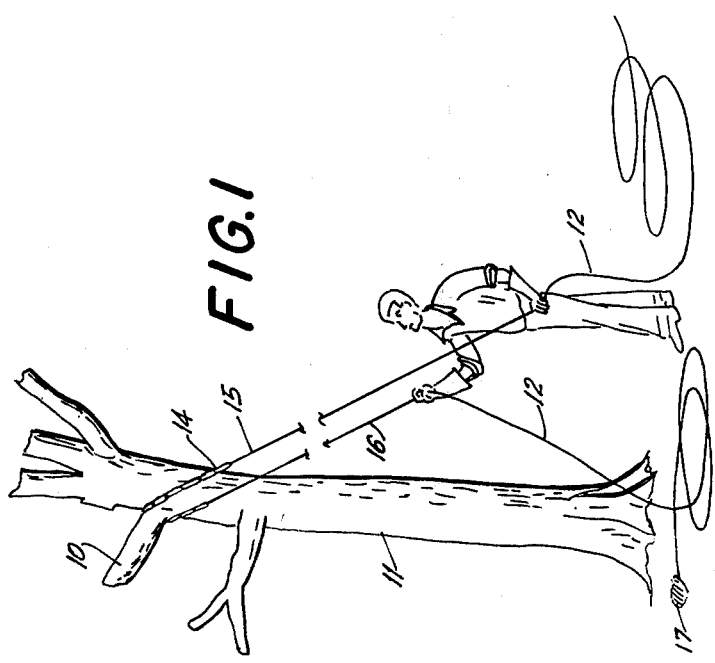
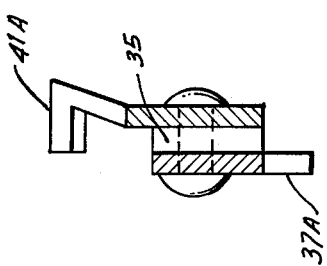
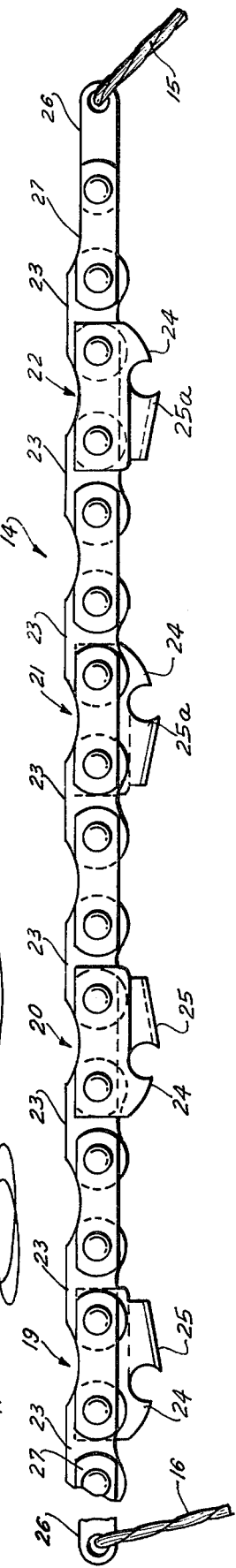
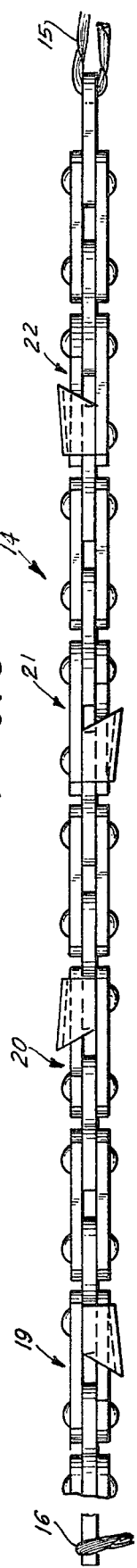

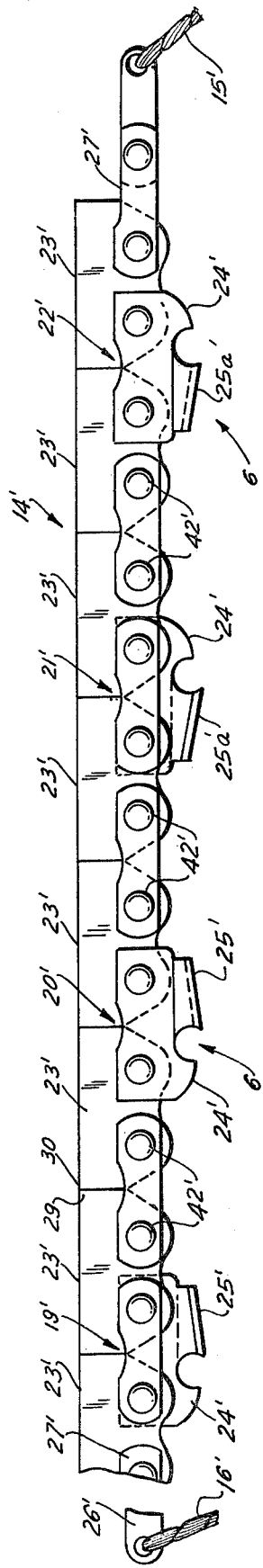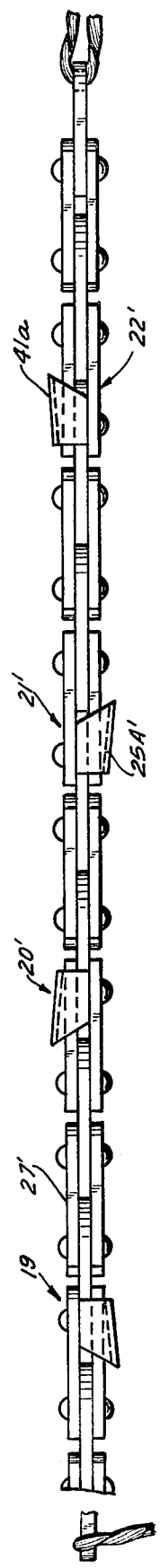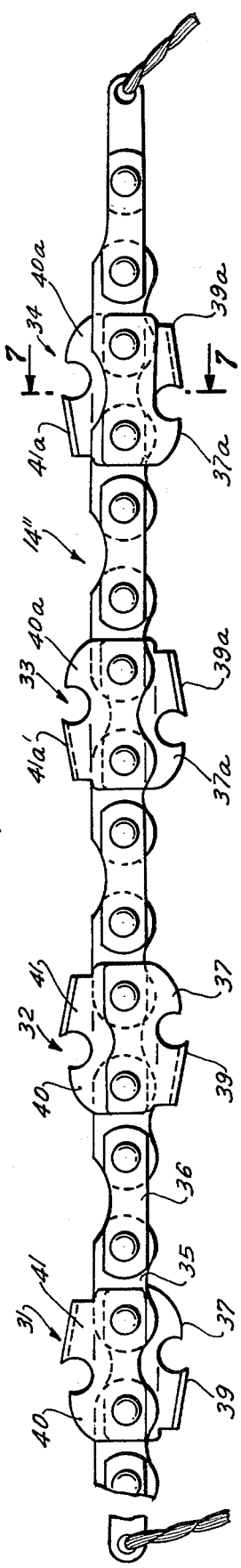

4,218,820

HAND-ACTUATED CHAIN SAW

This invention relates to a reciprocating chain saw which is adapted for the removal of high limbs from a tree by a workman standing on the ground.

The invention has among its objects the provision of an improved reciprocating chain saw, the depth of cut of the cutting blades of which is controlled by depth gauges associated with the blades, whereby the effort required to reciprocate the chain saw during a cutting operation may be predetermined.

Another object of the invention, and one embodiment thereof, is the provision of a chain saw with cutting means disposed along one side thereof, such chain saw incorporating means whereby it may be made to bend so as to wrap partially around the limb of a tree to be cut in only the direction in which the cutting blades confront and actively engage the limb.

Yet another object of this invention, in another embodiment thereof, is the provision of a chain saw which is adapted for manual reciprocation, as in the cutting of the limb of a tree, which has cutting means disposed along the opposite sides thereof, so that it is immaterial in which direction the chain is bent or wrapped around the limb of a tree, since in either of its bent or wrapped conditions teeth on the chain will confront and actively engage the limb.

Yet another object is to provide a chain saw adapted for manual reciprocation which can be used by two persons to cut logs on camping trips and the like.

Yet another object is to provide a chain saw which is adapted for all uses where a reciprocating flexible cutting blade is appropriate. Such cutting blade may be reciprocated manually or by a suitably connected motor means.

In all of the disclosed embodiments of the chain saw of the invention, a plurality of cutting means are disposed along a side of the chain, a number of such cutting means being so disposed on the chain as to cut the workpiece, such as a tree limb, in one direction of movement of the chain, and a number of different cutting means arranged on the same side of the chain and are disposed so as to cut the workpiece when the chain is moving in the opposite direction. Preferably, the number of the cutting means in the set thereof which acts in one direction of movement of the chain is equal to the number of cutting means in the other set thereof which acts during the opposite movement of the chain. Each cutting means is formed as a link in the chain, such link incorporating a single cutting blade and a depth gauge which leads it during the active cutting operation performed by such blade. This permits the thickness of the chip, that is, the depth cut taken by a blade, to be limited as desired, so that the effort required to operate the chain saw may be generally predetermined to be well within the capabilities of the average workman.

The invention will be more readily understood upon the consideration of the accompanying drawings, in which:

FIG. 1 is a view in perspective showing a hand-actuated chain saw in accordance with the invention in use;

FIG. 2 is a view in side elevation of a first embodiment of the chain saw of the invention, the teeth on the saw being located along only one side thereof;

FIG. 3 is a view in bottom plan of the saw shown in FIG. 2;

FIG. 4 is a view in side elevation of a second embodiment of hand-actuated chain saw in accordance with the invention, such saw being able to be bent or wrapped around a limb of a tree in only the position in which the cutting teeth confront the limb;

FIG. 5 is a view in side elevation of a third embodiment of hand-actuated chain saw in accordance with the invention, such saw incorporating cutting teeth on both sides thereof and being able to be bent around a limb in either direction;

FIG. 6 is a view in bottom plan of the saw shown in FIG. 4; and

FIG. 7 is a view in vertical section through the saw of FIG. 5, the section being along the line 7—7 in FIG. 5.

Turning first to FIG. 1, there is there shown a woodman in the act of cutting off a limb 10 of a tree 11 by use of a hand-actuated chain saw 14 in accordance with the invention. The saw 14, which is flexible in at least the direction which permits it to be partially wrapped around the limb 10, is actuated by a flexible member such as a rope 12 having opposite branches 15 and 16 connected to the respective opposite ends of the saw 14. As will appear more fully upon consideration of FIGS. 2-6, inclusive, the saw 14 cuts in both directions as the branches 15 and 16 of the rope 12 are alternately pulled. In order to position the saw 14 about the limb 10, one of the branches 15, 16 of the rope 12, in this instance the branch 16, is provided on its free end with a weight 17 such as a small sand bag. In order initially to position the saw 14 as shown, the weight or sand bag 17 is thrown up over the limb 10, the branch 16 of the rope then being worked down into a position close to the trunk of the tree if necessary, by alternately pulling on the ends of the branches 15, 16 of the rope. After the branch 16 of the rope has then assumed a position close to the trunk of the tree, the branch 16 of the rope is then pulled in order to pull the saw 14 upwardly into engagement with the limb.

As above indicated, a first embodiment of the chain saw of the invention is shown in FIGS. 2 and 3, a second embodiment thereof is shown in FIGS. 4 and 6, and a third embodiment thereof is shown in FIGS. 5 and 7.

Turning first to the embodiment of FIGS. 2 and 3, the chain saw 14 there shown incorporates four serially pivotally connected cutters 19, 20, 21, and 22, cutters 19 and 20 actively cutting a limb when the chain is moved to the left, and cutters 21 and 22 actively cutting the limb when the chain is moved to the right. Successive cutters are connected by a serially pivotally connected first link 26, a pair of straps 27, and a second connecting link 23. The connecting links 23 are interposed throughout the chain saw between the cutters. Each of cutters 19 and 20 has a depth gauge 24 and a cutter blade which follows it, the cutting edge of cutter blades 25 facing to the left, whereas the cutter blades 25a of each of cutters 21 and 22 face to the right. As is conventional in power-driven chain saws, the depth gauges 24 and cutter blades 25 are made integral and are disposed in the chains to function as straps, the side plates or straps of cutters 19 and 20 being disposed on opposite sides of the chain. The same is true of the cutter blades 25a of cutters 21 and 22. As shown in FIGS. 2 and 3, the active cutting edges of cutter blades 25a face to the right. Branch 15 of rope 12 is attached to the right hand end of chain saw 14 by means of a serially pivotally connected link 26 and two side straps 27; branch 16 of rope 12 is similarly connected to the left hand end of the chain saw.

It will be apparent that the chain 14 of FIGS. 2 and 3 can bend in opposite directions relative to the longitudinal axis thereof, and that care must be exercised initially to position the chain with the cutting edges thereof confronting and engaging the limb to be cut. In the embodiment of the chain saw shown in FIG. 4, wherein parts which are the same as those in FIGS. 2 and 3 are designated by the same reference characters with an added prime, there is incorporated a means which prevents the chain saw from being bent or wrapped around the limb in other than the position in which the cutter blades of the saw confront and engage the limb to be cut. Such means takes the form of confronting projections 29 and 30, which are provided on confronting ends of the connecting links 23'. As can be noted from FIG. 4, the connecting links 23' are differently shaped than the connecting links 23 of FIG. 2. Projections 29 and 30 are disposed somewhat above the axes of the pivot pins 42' connecting successive portions of the chain as the chain is shown in FIG. 4, so that the chain is free to be bent into one direction only relative to the plane perpendicular to the pivot pins and passing midway between the straps 27'. It is of course understood and desired to be included in this invention that the links, cutters, teeth and straps of the chain saw can be shaped in such way to obtain the result of bending rigidity in one of two directions.

When the chain saw 14' of FIG. 4 is pulled upwardly toward a limb of a tree by pulling on the branches 15, 16 of the rope 12, the chain 14' must necessarily bend in such direction as to present its cutter blades to the limb as it is pulled around the limb into the position thereof shown in FIG. 1.

In the third disclosed embodiment of the hand-actuated chain saw in accordance with the invention, cutter blades are provided on both sides of the saw 14". This assures that when the chain saw is disposed about a limb of a tree to be cut, a set of cutter blades will be automatically disposed confronting and in operative engagement with the limb. Not only that, but the saw 14" may be used for an appreciably longer time between the sharpening of the cutter blades than in the first and second disclosed embodiments, since in normal use of the saw wear on the sets of cutter blades on the opposite sides of the chain will be randomly divided between such sets.

The saw 14" is made up of a plurality of dual cutting members 31, 32, 33, and 34, which are serially pivotally connected by means of links 35 and straps 36. The cutter blades 39 of each of cutting means 31 and 32 on the bottom thereof as shown in FIG. 5 cut when the chain is moved to the right, and the cutter blades 39a of cutting members 33 and 34 cut when the chain 14" is moved to the left. A depth gauge 37 is disposed in advance of each of cutting blades 39 in its cutting stroke and a depth guage 37a is disposed in advance of each of cutter blades 39a in its cutting stroke. On the top of chain 14" as it is shown in FIG. 5, the cutting means 31 and 32 are provided with cutter blades 41 which, when the chain is inverted, cut when the chain is moved to the left, and the cutting means 33 and 34 are provided with cutting means proper 41a which, when the chain is inverted, cut when the chain 14" is moved to the right. A depth gauge 40 is disposed in advance of each of cutter blades 41, and a depth gauge 40a is disposed in advance of each cutter blade 41a.

As shown in FIG. 7, each respective set formed of a cutter blade and a depth gauge is formed as an integral member functioning as a side strap in the chain, such straps in cutting means 31 and 32 being disposed on opposite sides of the chain, as is true of the strap incorporating the cutter blade 41a of each of cutting means 33 and 34.

Although the invention is illustrated and described with reference to a single preferred embodiment thereof, it is to be expressly understood that it is in no way limited by the disclosure of such a single preferred embodiment, but is capable of numerous modifications within the scope of the appended claims.

What is claimed is:

1. A link articulated reciprocatable elongated chain saw having a plurality of zones possessing the capability of cutting in either of two directions comprising:
    (a) a first surface, a second surface, a first side and a second side;
    (b) each zone having at least four link cutter means in elongate spaced relationship from each other and having upstanding cutting edge means along said first surface and spaced therefrom;
    (c) each of said cutting edge means having a planar cutting edge essentially parallel to said first surface with two of said cutting edge means facing in one direction and the other two of said cutting edge means facing in the opposite direction whereby cutting action ensues when said chain saw is reciprocated in either direction;
    (d) two of said four link cutter means disposed along said first side in spaced relationship and each cutting edge disposed in an opposite direction;
    (e) the other two of said four link cutter means disposed along said second side in spaced relationship and each cutting edge disposed in an opposite direction;
    (f) said four link cutter means having depth gauge portion means preceding said cutting edge means and in spaced relationship thereto;
    (g) said four link cutter means being spaced from each other by link means.

2. The reciprocatable elongated chain saw of claim 1 wherein:
    (a) the said chain saw has a first end and a second end;
    (b) an end of a first flexible elongated line is pivotally attached to said first end;
    (c) an end of a second flexible elongated line is pivotally attached to said second end.

3. The reciprocatable elongated chain saw of claim 2 wherein a weight is attached to the other end of at least one of said flexible lines.

4. The reciprocatable elongated chain saw of claim 1 wherein the link means comprises:
    (a) a single link extending outwardly from each link cutter means and being pivotally connected to said link cutter means an end portion of said single link;
    (b) a double link means comprising two strap means attached at one end portion to another end of one of said single links and the other end portion of said double link means attached to an end of a different said single link whereby said end portions of said single links are sandwiched between said two strap means.

5. The reciprocatable elongated chain saw of claim 4 wherein:
    (a) the said chain saw has a first end and a second end;
    (b) an end of a first flexible elongated line is pivotally attached to said first end;
    (c) an end of a second flexible elongated line is pivotally attached to said second end.

6. The reciprocatable elongated chain saw of claim 5 wherein a weight is attached to the other end of at least one of said flexible lines.

* * * * *